(12) United States Patent
Sikora et al.

(10) Patent No.: US 9,743,689 B2
(45) Date of Patent: Aug. 29, 2017

(54) METHOD AND A SYSTEM FOR PRODUCTION OF ROD-SHAPED ARTICLES

(71) Applicant: International Tobacco Machinery Poland Sp. z o. o., Radom (PL)

(72) Inventors: Leszek Sikora, Radom (PL); Bartosz Cieślikowski, Radom (PL)

(73) Assignee: International Tobacco Machinery Poland Sp. z o. o., Radom (PL)

( * ) Notice: Subject to any disclaimer, the term of this patent is extended or adjusted under 35 U.S.C. 154(b) by 0 days.

(21) Appl. No.: 15/295,705

(22) Filed: Oct. 17, 2016

(65) Prior Publication Data
US 2017/0143033 A1     May 25, 2017

(30) Foreign Application Priority Data

Nov. 24, 2015 (EP) .................................. 15196141

(51) Int. Cl.
| | |
|---|---|
| *A24D 3/02* | (2006.01) |
| *A24C 5/28* | (2006.01) |
| *A24C 5/345* | (2006.01) |
| *A24C 5/34* | (2006.01) |
| *A24C 5/32* | (2006.01) |

(52) U.S. Cl.
CPC .............. *A24D 3/0295* (2013.01); *A24C 5/28* (2013.01); *A24C 5/322* (2013.01); *A24C 5/345* (2013.01); *A24C 5/3412* (2013.01); *A24D 3/0229* (2013.01); *A24D 3/0287* (2013.01)

(58) Field of Classification Search
CPC .. A24D 3/0295; A24D 3/0229; A24D 3/0287; A24C 5/28; A24C 5/322; A24C 5/3412; A24C 5/345

USPC ...................................... 493/37, 16
See application file for complete search history.

(56) References Cited

U.S. PATENT DOCUMENTS 3,447,679 A * 6/1969 Molins ................. A24C 5/3418
                                                                                            209/535
4,011,457 A * 3/1977 Wolf ................... G01N 21/8915
                                                                                           250/214 RC (Continued)

FOREIGN PATENT DOCUMENTS

| EP | 1704786 A1 | 9/2006 |
|---|---|---|
| EP | 2687111 A2 | 1/2014 |
| WO | 2005046365 A1 | 5/2005 |

OTHER PUBLICATIONS

Extended European search report in application 15196141.4, dated Jun. 3, 2016.

*Primary Examiner* — Sameh Tawfik
(74) *Attorney, Agent, or Firm* — Oppedahl Patent Law Firm LLC

(57) ABSTRACT

A system for manufacturing rod-like articles, comprising a machine for manufacturing the rod-like articles or a feeding device for delivering the rod-like articles, a first measuring unit for measuring at least one quality parameter of the manufactured rod-like articles, a device for dividing a stream of the rod-like articles into a first stream and into a second stream, a first transferring device, which receives the first stream of the rod-like articles and transfers this stream as an output stream of the rod-like articles manufacturing system, a second transferring device which transfers inspected rod-like article to the output stream of the rod-like articles on the first transferring device.

8 Claims, 9 Drawing Sheets

(56) References Cited

U.S. PATENT DOCUMENTS

| | | | |
|---|---|---|---|
| 4,043,454 A * | 8/1977 | Reuland | A24C 5/3412 209/571 |
| 4,212,541 A * | 7/1980 | Ducommun | G01B 11/26 250/559.45 |
| 4,238,994 A * | 12/1980 | Koch | A24C 5/31 250/559.4 |
| 4,607,252 A * | 8/1986 | Neri | G05B 19/048 340/3.43 |
| 5,013,905 A * | 5/1991 | Neri | A24C 5/3412 209/536 |
| 5,432,600 A * | 7/1995 | Grollimund | A24C 5/3412 356/237.2 |
| 5,627,372 A | 5/1997 | Sturm | |
| 6,181,372 B1 * | 1/2001 | Neri | A24C 5/3412 131/280 |
| 8,515,570 B2 * | 8/2013 | Lee | A24C 5/3412 131/282 |
| 8,662,088 B2 | 3/2014 | Owczarek | |
| 8,869,969 B2 | 10/2014 | Cielikowski et al. | |
| 8,925,708 B2 | 1/2015 | Cielikowski et al. | |
| 8,967,370 B2 | 3/2015 | Cielikowski | |
| 9,004,261 B2 | 4/2015 | Cielikowski et al. | |
| 9,061,835 B2 | 6/2015 | Gielniewski | |
| 9,161,571 B2 | 10/2015 | Sikora | |
| 9,221,614 B2 * | 12/2015 | Figarski | A24D 3/0287 |
| 2001/0001390 A1 | 5/2001 | Smith | |
| 2004/0173226 A1 * | 9/2004 | Hanaoka | G01N 21/952 131/280 |
| 2005/0022831 A1 | 2/2005 | Hirsch | |
| 2005/0054501 A1 * | 3/2005 | Schroder | A24C 5/3412 493/39 |
| 2005/0098744 A1 * | 5/2005 | Schroder | A24C 5/3412 250/559.19 |
| 2006/0213531 A1 | 9/2006 | Draghetti et al. | |
| 2007/0144542 A1 | 6/2007 | Bencivenni et al. | |
| 2009/0145449 A1 * | 6/2009 | Cieslikowski | A24D 3/0287 131/280 |
| 2012/0010059 A1 * | 1/2012 | Righetti | A24D 3/0295 493/4 |
| 2012/0077659 A1 * | 3/2012 | Yanchev | A24D 3/0287 493/39 |
| 2013/0037379 A1 | 2/2013 | Hoffmann | |
| 2013/0087056 A1 | 4/2013 | Chojnacki | |
| 2014/0011652 A1 | 1/2014 | Cieslikowski et al. | |
| 2014/0076694 A1 * | 3/2014 | Cieslikowski | B65G 19/02 198/731 |
| 2014/0097107 A1 | 4/2014 | Zagajska | |
| 2014/0123826 A1 | 5/2014 | Cieslikowski et al. | |
| 2014/0158252 A1 | 6/2014 | Owczarek | |
| 2014/0235416 A1 | 8/2014 | Lisowski et al. | |
| 2015/0013519 A1 | 1/2015 | Cieslikowski et al. | |
| 2015/0047137 A1 | 2/2015 | Gielniewski | |
| 2015/0068376 A1 | 3/2015 | Boleslawski | |
| 2015/0114543 A1 | 4/2015 | Riedel | |
| 2015/0114988 A1 | 4/2015 | Riedel | |
| 2015/0342247 A1 | 12/2015 | Ugrewicz | |
| 2016/0000142 A1 | 1/2016 | Stanikowski et al. | |

* cited by examiner

METHOD AND A SYSTEM FOR PRODUCTION OF ROD-SHAPED ARTICLES

The subject matter of the present patent application is a method and system of manufacturing rod-like articles used in the tobacco industry.

BACKGROUND OF THE INVENTION

The subject matter relates to the products and semi-finished products of the tobacco industry. Products of the tobacco industry, such as cigarettes and filter rods as well as the semi-finished products such as sections of cigarettes and filter rods are defined as rod-like articles or rod-like products. They are manufactured or processed by means of the line techniques or drum techniques. In both techniques finished products are made as a result of cutting an endless rod formed by means of a wrapper, whereas the endless rod consists of various types of tobacco and filtering materials, and some other materials. Such a rod is cut into single articles which are fed to successive stages of the manufacturing process. As regards the line technique, the component parts are put together with each other on a moving band. However, in the case of the drum technique, the component parts, for instance filter rods, are put together with each other on drum conveyors, and subsequently wrapped in a wrapper. Regardless the applied technique, the rod-like articles undergo an inspection, during which the quality parameters of the manufactured rod-like articles are checked, in order to reject defective articles from the manufacturing process.

According to state of the art, there are known documents presenting various systems for performing quality inspection of the manufactured rod-like articles. The patent U.S. Pat. No. 4,212,541A discloses the manufacturing system for producing multi-segment rods equipped with a measuring unit and a system for rejecting defective products.

Manufacturers check many different parameters which determine the articles quality, whereas for various articles, various parameters can be checked. For the filter rod manufactured of single type of filtering material, the quality parameters are diameter, length, materials uniformity, and lack of foreign inclusions. In case of the filter rod manufactured of the uniform material, in which the capsules are inserted (for example with the aromatic substance), additionally the following parameters will be checked: presence of capsules in proper places, capsule size, capsule quality, distance of a capsule from the rod end, distances between particular capsules as well as the central position of the capsule in the lateral cross section of the rod. In case of the multi-segment rods consisting of various segments, the crucial quality parameters will be the following: lengths of particular segments, distances between particular segments, and if the segments consist of capsules, then, additionally, position of capsules in segments along the axis as well as in particular cross sections of segments. During the manufacturing of the rod-like articles, at least few quality parameters are checked, whereas the measurements of the parameters are conducted at various speeds, within the entire efficiency range of the manufacturing machines. There is a number of crucial aspects of conducting measurements. The most important aspect is performing measurements at high speed of the manufacturing machine. For the speed of an endless rod of the order of 500 m/min the risk of conducting inaccurate measurements increases. The dynamics of the process increases so does the risk of measurements interferences. The measurement time is very short and the risk of effect of random factors, which are not taken into account by the control system and lead to measurement errors, increases. In order to ensure high efficiency of the measuring unit, measurements of certain parameters are performed by means of several sensors and the measurements results from each sensor are compared to each other or averaged. Alternatively, one parameter can be measured by means of multiple sensors measuring the same parameter on the basis of various principles of measurement, and then the results are compared to each other. The quality parameters have predetermined ranges, within which the values of the measured parameter should fall. The control system receives the results of all measurements and takes the decision to reject an article if the actual value of any of the parameters does not fall within the required range of the acceptable parameter values. There is a demand of the tobacco industry manufacturers to reject only such articles, the quality parameters of which indeed fall outside the acceptable limits of parameters, i.e. outside the parameter tolerance limit. The most serious problem during conducting measurements is the fact that part of the parameters is close to the limit values of the parameter range. The measurement of the value of the parameter by the measuring unit has an accuracy of a measuring sensor. Therefore, close proximity of the measured value to the acceptable limit of the parameter increases risk of incorrect article classification. Low accuracy of the measurement introduces the risk that the measurement of both good and defective article can produce the same result. In the case of conducting the measurement of one parameter by means of two or three sensors and if there are results discrepancies, i.e. when some of sensors indicate that the measured article fulfils the quality requirements, whereas the remaining sensors indicate that the measured article does not fulfil the quality requirements, there is a risk of incorrect article classification. Aspiring to eliminate all potentially defective articles from manufacturing, all the articles, the parameters of which cannot be clearly defined, can be rejected. Nevertheless, there is a demand among the manufacturers for a system which will be rejecting from manufacturing only defective articles and which will not be rejecting articles having the correct quality parameters.

BRIEF SUMMARY OF THE INVENTION

The subject matter of the invention is a method of manufacturing rod-like articles, where the rod-like articles are manufactured on a machine for manufacturing the rod-like articles or the rod-like articles are delivered from a feeding device, a measurement is effected with a first measuring accuracy on a first measuring unit for measuring of at least one quality parameter of the manufactured rod-like articles, whereas the said quality parameter has a predefined range of acceptable values of the parameter, the stream of the rod-like articles is divided into a first stream comprising the rod-like articles, for which the said quality parameter falls within the range of the acceptable values of the parameter and a second stream of the rod-like articles, for which at least one of the said quality parameter does not fall within the range of the acceptable values of the parameter, the first stream is transferred as an output stream of a system of manufacturing the rod-like articles by means of a first transferring device. The method according to the invention is characterized in that the second stream of the rod-like articles is transferred through a repeated quality inspection path on a measuring conveyor and a repeated measurement is effected in a second measuring unit with a second measuring accuracy higher than the first measuring accuracy of the first measuring unit, the inspected rod-like article is transferred by means of a second transferring device to the output stream of the rod-like articles on the first transferring device, if the result of the repeated inspection of the said quality parameter for the individual rod-like article falls within the range of the acceptable values of the said parameter.

An advantage of such method of the present invention is that all produced good rod-like articles subject to additional inspection are transferred to the successive production stage and do not constitute the production waste.

The method of the present invention is characterized by the fact, that the rod-like articles are manufactured by forming an endless rod and cutting the endless rod into individual rod-like articles, whereas at least one quality parameter of the endless rod is measured before cutting, where an appropriate quality parameter is assigned to an individual rod-like article on the basis of the measurements of the endless rod.

The method of the present invention is characterized by the fact that the article having the said at least one quality parameter of the value close to the limit value of the range of the acceptable values of the said parameter is directed for the repeated inspection in order to verify the values of the measured parameter.

The method of the present invention is characterized by the fact that the difference between the measured value of the said parameter and the limit value of the range of the acceptable values of the said parameter is equal to or less than the accuracy of the measurement.

The articles with the quality parameters falling close to the limit acceptable values and which turn out to be good articles, are attached directly to the output stream of the manufactured articles, immediately after the measurement, and there is no need of gathering them in order to subsequently separately introduce them into the further production stages.

The method of the present invention is characterized by the fact that the article having the said at least one quality parameter which falls within the range of the acceptable values of the said parameter is directed for the repeated inspection in order to verify the measurement correctness.

The method of the present invention ensures the possibility of verifying the actual quality parameters which cause the article rejection and ensures the possibility of verifying the correct functioning of the control system.

The method of the present invention is characterized by the fact that the stream of the rod-like articles is transferred on at least one drum conveyor.

The method of the present invention is characterized by the fact that the measurement by means of the first measuring unit is effected on at least one drum conveyor.

The method of the present invention is characterized by the fact that the output stream is the mass flow.

The method of the present invention is characterized by the fact that the repeated measurement of the said at least one quality parameter is effected at a lower article transfer speed than the transfer speed during the first measurement.

The subject matter of the invention is also a system for manufacturing rod-like articles, comprising a machine for manufacturing the rod-like articles or a feeding device for delivering the rod-like articles, a first measuring unit for measuring at least one quality parameter of the manufactured rod-like articles, which measures with a first measuring accuracy, whereas the said quality parameter has a predefined range of acceptable values of the parameter, a device for dividing a stream of the rod-like articles into a first stream including the rod-like articles having said at least one quality parameter which falls within the range of the acceptable values of the parameter and into a second stream of the rod-like articles, having the said at least one quality parameter which does not fall within the range of the acceptable values of the parameter, a first transferring device, which receives the first stream of the rod-like articles and transfers this stream as an output stream of the rod-like articles manufacturing system. A system is characterized in that it is moreover equipped with a device for a repeated inspection of the said quality parameter, including a measuring conveyor which receives the second stream of the rod-like articles and a second measuring unit which effects a repeated measurement of the said quality parameter of the rod-like article with a second measuring accuracy higher than the first measuring accuracy of the first measuring unit, whereas the device for the repeated inspection of the said quality parameter belongs to the repeated quality inspection path, a second transferring device which transfers the inspected rod-like article to the output stream of the rod-like articles on the first transferring device, when the result of the repeated inspection of the said at least one quality parameter for an individual rod-like article falls within the range of the acceptable values of the said parameter.

The system of the present invention is characterized by the fact that the machine for manufacturing the rod-like articles is a machine for manufacturing the rod-like articles by forming an endless rod, whereas the machine is equipped with a cutting head for cutting of the endless rod into single rod-like articles, whereas the first measuring unit effects the measurement of the said at least one quality parameter of the endless rod with the first measuring accuracy, where the said appropriate quality parameter is assigned to a single rod-like article on the basis of the measurements of the endless rod.

The system of the present invention is characterized by the fact that the output stream is a mass flow.

The system of the present invention is characterized by the fact that the first measuring unit conducts measurements of the articles transferred on at least one drum conveyor.

The system of the present invention is characterized by the fact that the device for the repeated parameter inspection is adapted for effecting the repeated measurement of the said at least one quality parameter at a lower article transfer speed than the transfer speed during the first measurement.

The system is characterized by its simplicity and it can be easily integrated with the existing manufacturing systems.

The system and the method enables the analysis of the quality parameters of the articles which are either defective, good or with parameters, the value of which is close to the limit value of the acceptable range. The system of the present invention ensures the possibility of analyzing how the scattering of quality parameters of the rod-like articles manufactured on particular machines is distributed.

BRIEF DESCRIPTION OF THE SEVERAL VIEWS OF THE DRAWINGS

The object of the invention has been presented in preferred embodiments in a drawing in which.

DETAILED DESCRIPTION OF THE INVENTION

Figure 1:
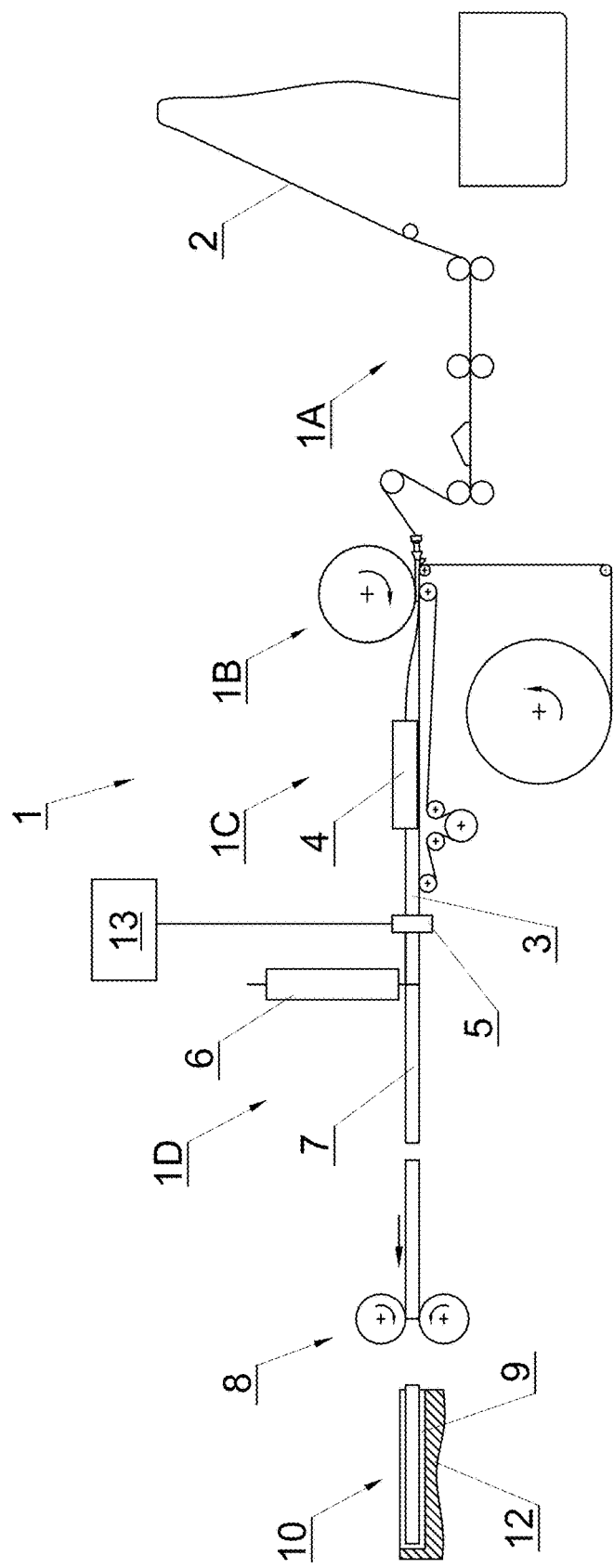
FIG. 1 shows a manufacturing machine view (the system components are not presented at scale)
Figure 2:
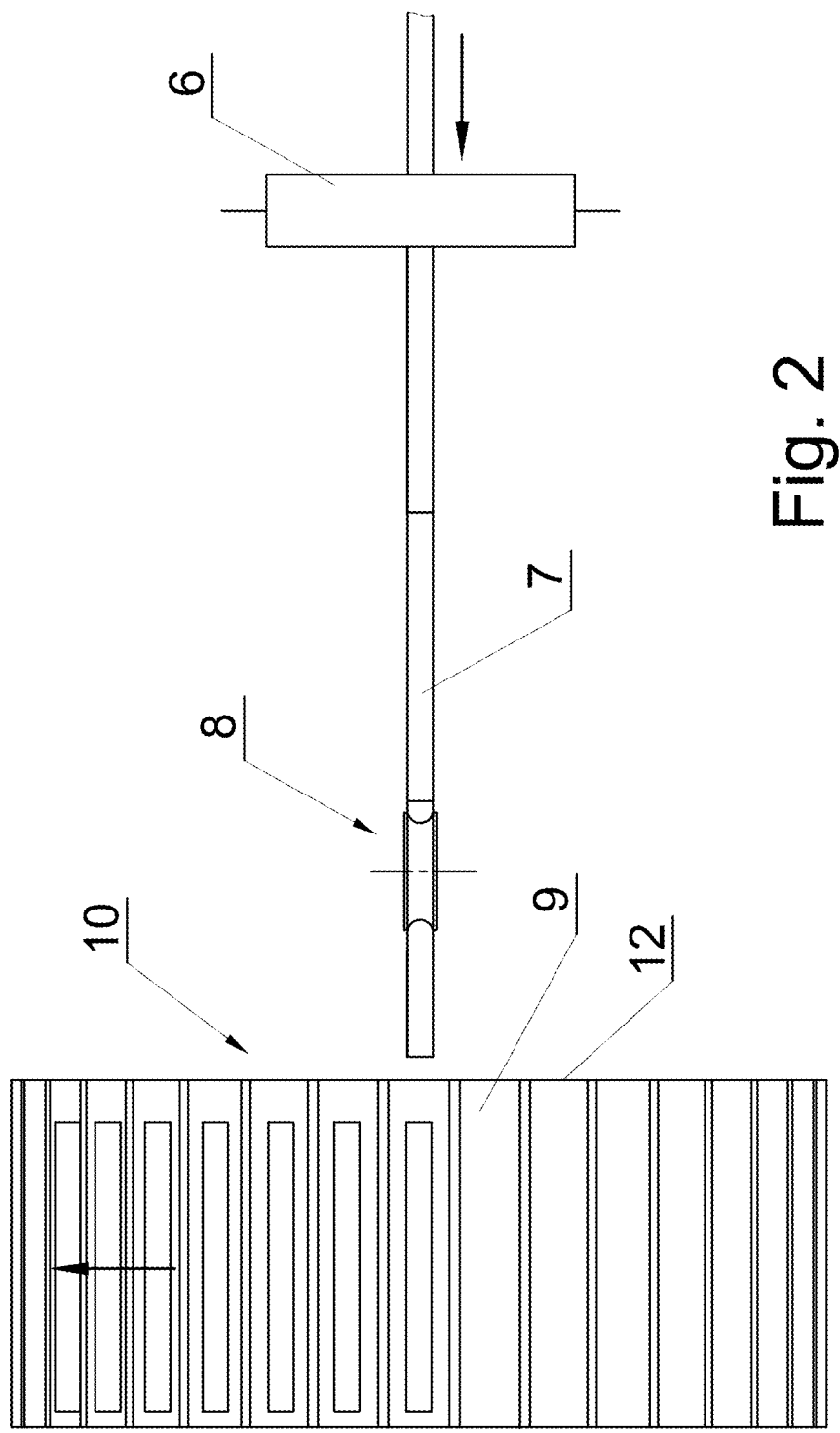
FIG. 2 shows a part of the manufacturing machine of FIG. 1 and a part of a receiving device.
Figure 3:
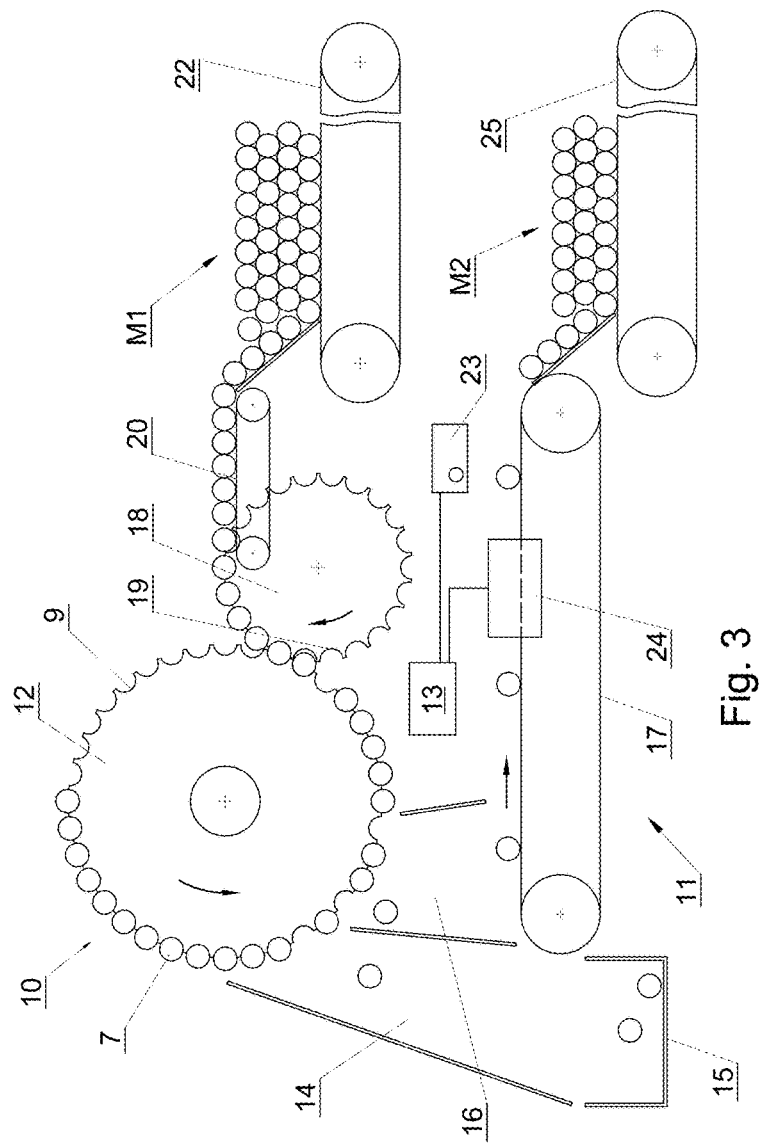
FIG. 3 shows a part of the rod-like articles manufacturing system in its first embodiment.

The manufacturing machine 1 shown in FIG. 1 is used for manufacturing rod-like articles in the form of filter rods of filtering material 2, whereas capsules with an aromatic substance are placed in the rod. The machine 1 included in the articles manufacturing system comprises a feeding unit 1A which feeds the filtering material, for example acetate, part 1B in which the capsules are placed in the filtering material 2, forming unit 1C where an endless rod 3 is formed and part 1D where individual filter rods 7 are cut off. The forming of the endless rod 3 is performed in the forming unit 4. The formed rod 3 is transferred through a first measuring unit 5. The measuring unit 5 effects the measurements of quality parameters of the endless rod 3. The measuring unit 5 can be equipped with various types of sensors, for instance optical, microwave, ultrasound, x-ray and other sensors. The measuring unit 5 is the first measuring unit and effects measurement of at least one parameter with a predefined measurement accuracy. The signals from particular sensors or output signals from the measuring unit 5 are transmitted to a control system 13, to each rod element there are assigned the measured quality parameters, which are temporarily stored in the measuring unit or a control system memory. The endless rod 3 is transferred lengthwise and it is cut by means of a cutting head 6, a cutting device in general, into individual rods 7. At the same time, the control system stores temporarily in the memory unit the values of at least one quality parameter, assigned to individual rods 7 on the basis of the measurements previously conducted by the measuring unit 5. Usually, it is a set of quality parameters describing the manufactured rods. Each rod 7 which is cut is accelerated by an acceleration unit 8 and it is transferred to a first receiving device 10, and in this case it is placed in a flute 9 of a drum conveyor 12 (FIG. 1, FIG. 2). The drum conveyor 12 cooperates with a drum conveyor 18 shown in the FIG. 3, onto which the rods 7 are transferred. On the drum conveyor 18 the rods 7 are transported in the flutes 19. The drum conveyor 18 cooperates with a band conveyor 20, alongside which the rods 7 are transferred to form a mass flow M1 on a conveyor 22. The rods 7 are transferred on the conveyor 22 to a successive production stage. The mass flow M1 constitutes a first stream of the manufactured rods, whereas the first stream comprises the rods 7, for which the said at least one measured quality parameter falls within the range of the acceptable values of the parameter. The first stream constitutes the rod-like articles manufacturing system output stream, which is transferred from the system by means of the first transferring device, which is conducted by means of the conveyor 22 in this embodiment. The second rods stream is formed by separating the rods for which the said at least one measured quality parameter does not fall within the range of the acceptable values of the parameter. The drum conveyor 12 is equipped with not shown compressed air nozzles adapted for rejecting appropriate rods 7 indicated by the control system 13 from the flutes 9 during the transfer on the drum conveyor 12. The rejection can be performed on another cooperating drum conveyor, by means of which the rods 7 are transferred within the machine. The rods 7 which have been qualified as defective as a result of the measurement, can be thrown through a channel 14 to a container 15 (FIG. 3). The rods 7, which are supposed to undergo a repeated quality inspection, are directed as a second stream to the repeated quality inspection path. For this purpose the rods 7 are thrown through the channel 16 onto a measuring conveyor 17, which belongs to the repeated quality inspection path 11. On the repeated quality inspection path, on the measuring conveyor 17, there is effected the repeated inspection of the quality parameters of the manufactured rod-like articles—rods 7 by means of the second measuring unit 24. The defective articles, good articles and the articles for which the quality parameter value is close to the limit value of the range of the acceptable values of the parameter may undergo the repeated inspection. The rod-like articles 7 placed on the conveyor 17 are transferred through the second measuring unit 24, which effects the parameter measurement with the second measuring accuracy higher than the first measuring accuracy of the first measuring unit. The quality parameters of the article 7 may be inspected at a lower speed than the speed in the case of the first measuring unit 5 and the measurements may be effected by means of the same sensors or the sensors working on the same principle or by means of other sensors than the ones applied in the first measuring unit 5. The quality parameters may be inspected by means of the sensors of higher accuracy. The measuring signals from the second measuring unit 24 are transferred to the control system 13. Depending on the signals received from the second measuring unit, the control system 13 may allow transferring of the inspected rods 7, which fulfil the quality requirements, onto the conveyor 25, on which the rods are transferred as a second stream in a form of mass flow M2. At the same time the conveyor 25 is the second transferring device for transferring the second stream in the form of the mass flow M2, after the repeated inspection to the output stream of the rods manufacturing system on the first transferring device in the form of the conveyor 22. The control system has the possibility of rejecting the inspected rod 7 from the second stream. If, as a result of the measurement performed by the second measuring unit, the inspected article 7 appears to be defective, it is thrown from the conveyor 17 by means of a rejector, for example, in a form of the compressed air nozzle 23, if the inspected article appears to be good, it remains on the conveyor 17 and joins the mass flow M2. The mass flow M2 can be connected to the mass flow M1 in any way known to the specialist of the art. The defective rods 7 can be thrown into the container 15, whereas the rods having at least one quality parameter of a value close to the limit value of the range of the acceptable parameter values, are directed to the repeated quality inspection path, whereas it is possible to direct all the rods which have the quality parameter which does not fall within the range of the parameter values, to the second stream transferred through the repeated quality inspection path. Then, the defective articles will be directed through the channel 16 onto the measuring conveyor 17, their quality parameters will be measured, and then they will be thrown away from the measuring transporter 17. The manufacturing system of the present invention ensures the repeated quality inspection of defective or potentially defective articles, as well as the possibility of the occasional inspection of the articles, the quality parameters of which have been defined by the first measuring unit as correct. They are directed onto the measuring conveyor and after conducting and registering measurements, they are joined to the mass flow M2, and then to the mass flow M1 of the output stream of the rod-like articles manufacturing system.

Figure 4:
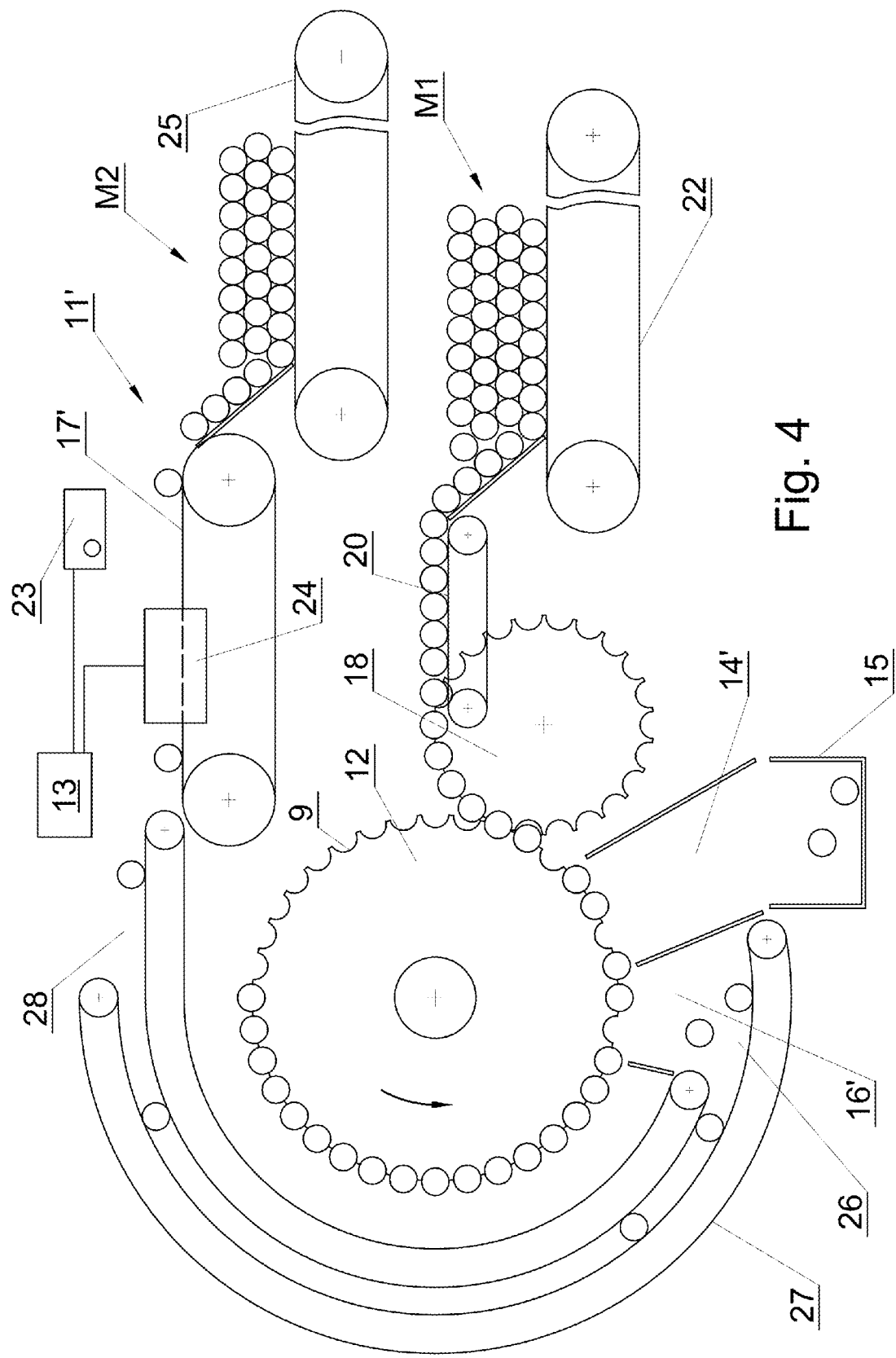
FIG. 4 shows a part of the rod-like articles manufacturing system in its second embodiment.
Figure 5:
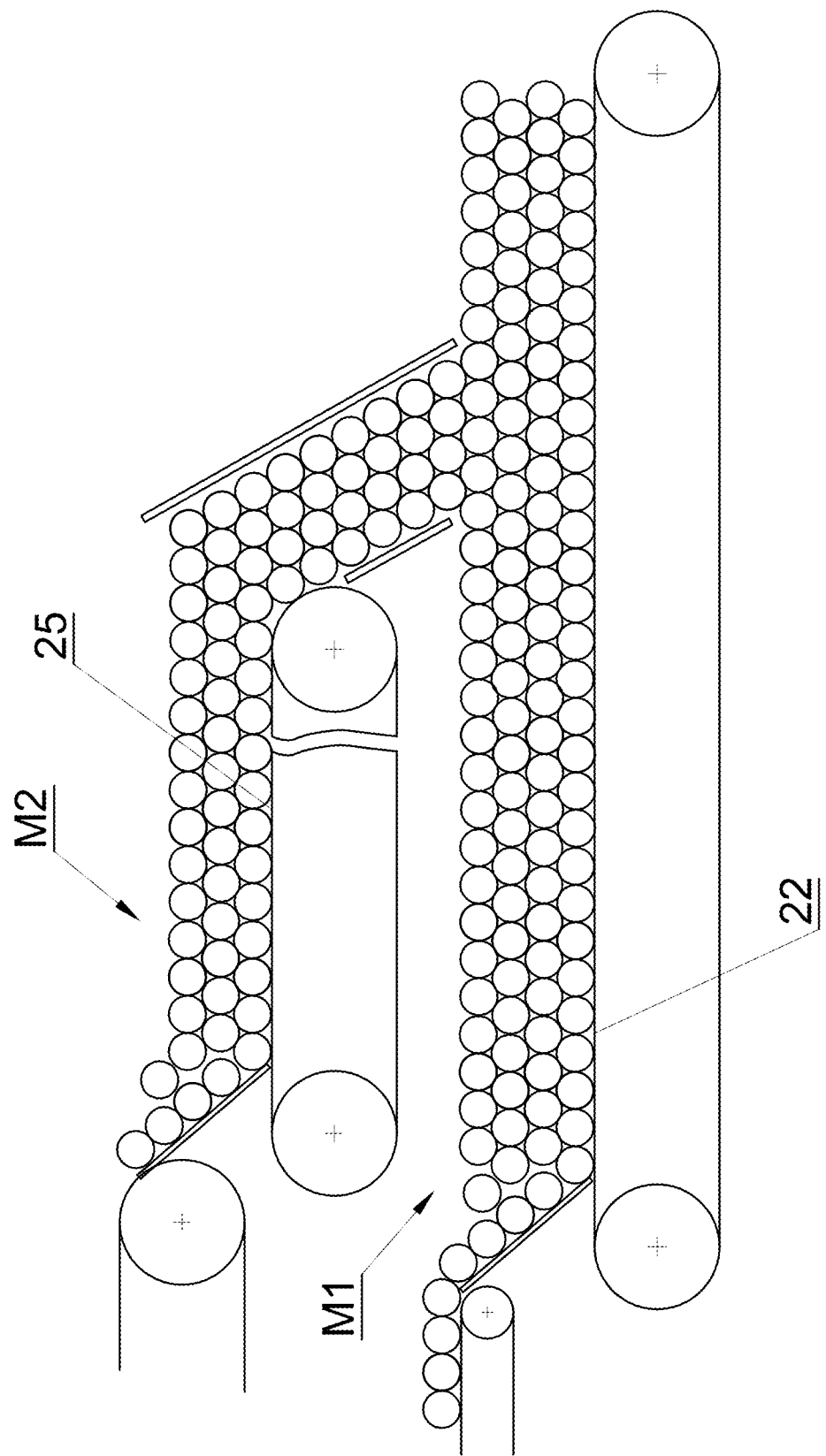
FIG. 5 shows a mass flow connecting unit.

FIG. 4 shows a fragment of the second embodiment of the rod-like articles manufacturing system. The system includes the manufacturing machine such as in the first embodiment. The corresponding rods 7 are fed to the flutes 9 of the drum conveyor 12. The rods having the quality parameters which fulfil the required quality requirements are transferred as the first stream (output stream) on the conveyor 22. The defective rods 7 can be thrown through the channel 14' into the container 15. The rods which are directed to the repeated quality inspection path are thrown through channel 16' onto the inlet 26 of the conveyor 27. It is possible to direct all the rods, for which at least one quality parameter does not fall within the range of the acceptable parameter values, in the form of a second stream through the channel 16'. The conveyor 27 is built in a form of a curve or a circle conveyor and transfers the rods 7 over the drum conveyor 12. From the outlet 28 the rods 7 are fed to the repeated inspection path 11'. Similarly to the first embodiment, the measuring unit 24 effects the repeated measurement of quality parameters. The rods having the quality parameters which are compatible with the expectations, i.e. fall within the acceptable range of the parameters values, are directed to the mass flow M2 on the conveyor 25, where the mass flow M2 is joined with the mass flow M1 on the conveyor 22, on which the rods 7 fulfilling the quality conditions, are delivered by means of the drum conveyor 18 and the band conveyor 20. FIG. 5 shows the embodiment of the unit joining the second rod stream in the form of the mass flow M2 to the first rod stream in the form of the mass flow M1. Depending on the actual positions of particular transferring units of the manufacturing system, the unit joining the mass flow M2 to M1 may take any form, it may be equipped with sensors monitoring the flow and with buffer reservoirs.

Figure 6:
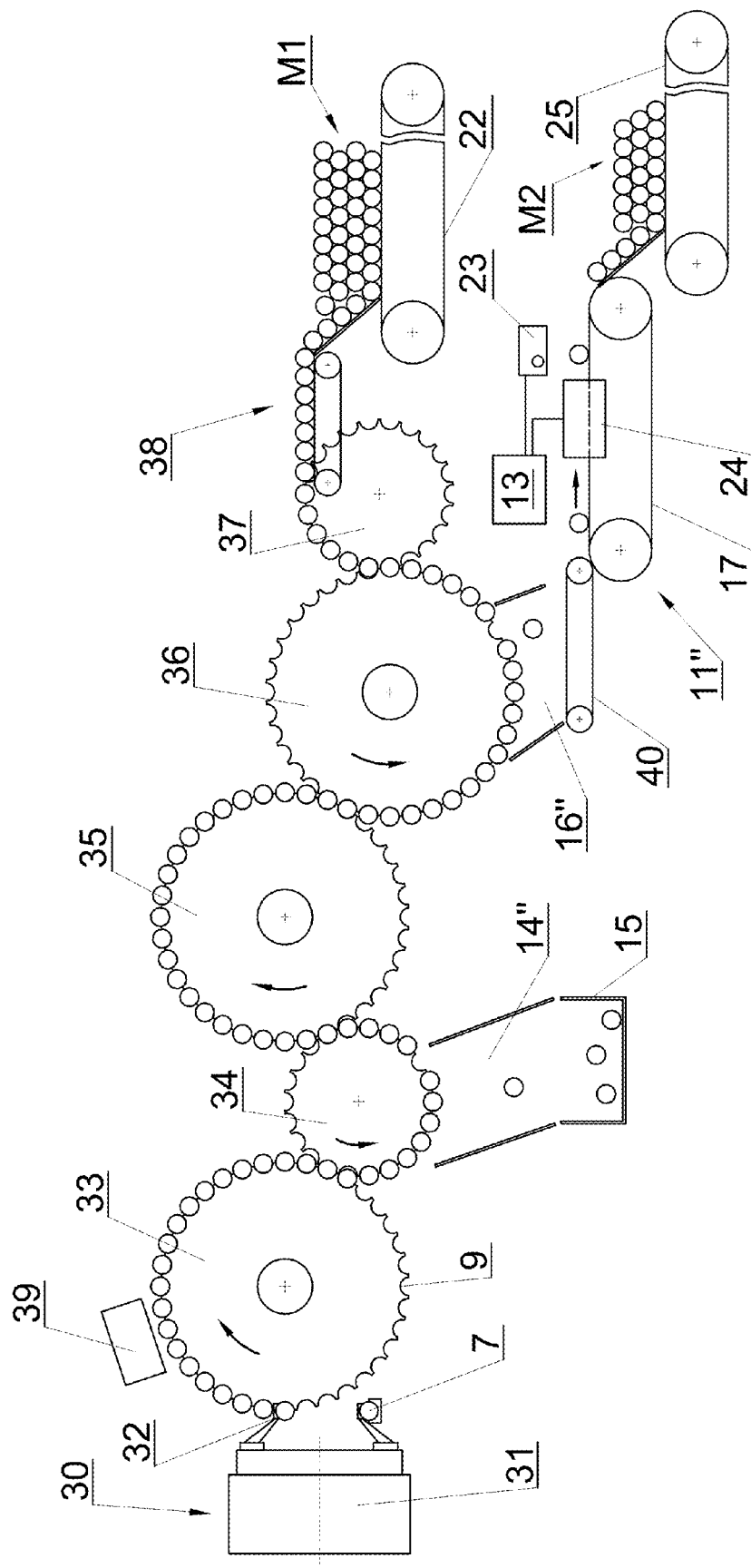
FIG. 6 shows a part of the rod-like articles manufacturing system in its third embodiment.

FIG. 6 shows the third embodiment of the rod-like articles manufacturing system. The shown feeding unit 31 constitutes a part of the machine 30 manufacturing rods 7. The feeding unit 31 is equipped with vacuum grippers 32 which perform a movement along an elliptical path and transfer the rods 7 into the flutes 9 of the drum conveyor 33. The rods are transferred through the successive drum conveyors 34, 35, 36, 37, on which various operations may be performed, in the flutes 9 additional rods may be placed, the rods may be cut, and the rods may be wrapped in a wrapper. Manufacturing machines may include more drum conveyors adapted for various processes effected on the rod-like articles. The manufactured rod-like articles are divided into two streams. The first stream transfers articles having quality parameters which fulfil the imposed requirements and which are received by the receiving device 38, the output stream is created in the form of mass flow M1. The system's embodiment is equipped with the measuring unit 39 for measurements of the rod-like articles 7 quality parameters. In case of detection of a defective article, which does not fulfil the quality requirements, such article is rejected from the drum 34 through the channel 14" into the container 15. The repeated inspection of the rod-like articles is performed similarly as in the first and second embodiment. The articles 7 are fed onto the repeated quality inspection path 11" through the receiving device in the form of a conveyor 40. The formed second stream is connected to the output stream similarly as in the case of the aforementioned embodiments.

Figure 7:
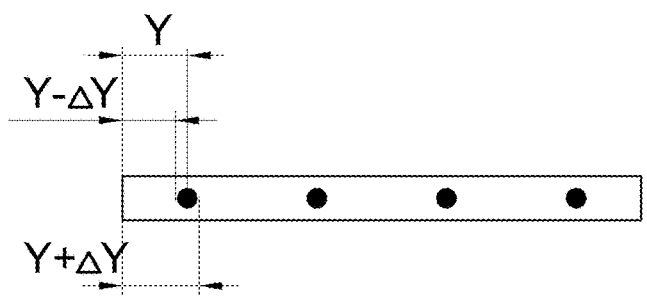
FIGS. 7, 8 show an embodiment of a rod-like article—a rod with capsules.
Figure 8:
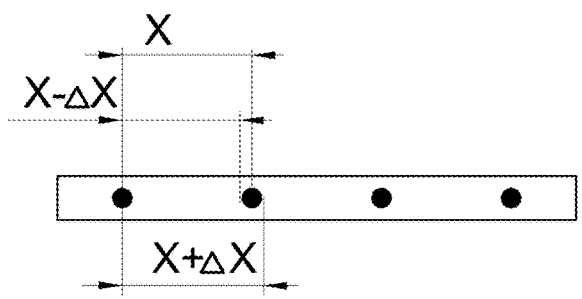
Figure 9:
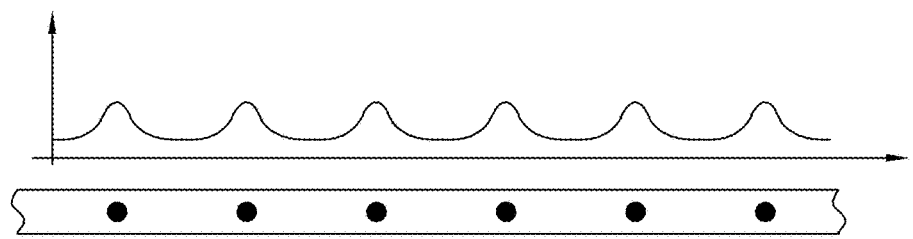
FIGS. 9, 10 show courses of signals from the sensor for the endless rod with capsules.
Figure 10:
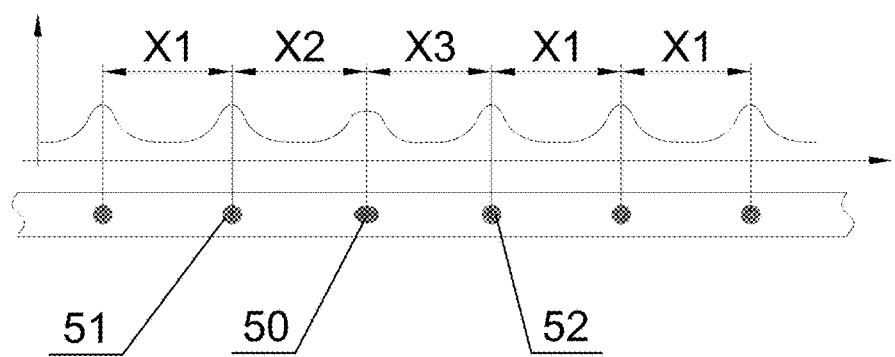
Figure 11:
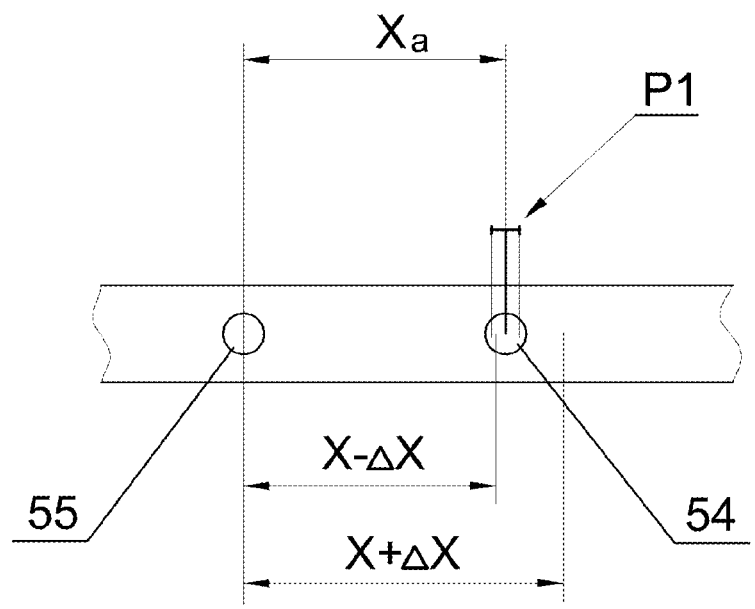
FIG. 11 shows an embodiment of a result of measurement by means of the first measuring unit.
Figure 12:
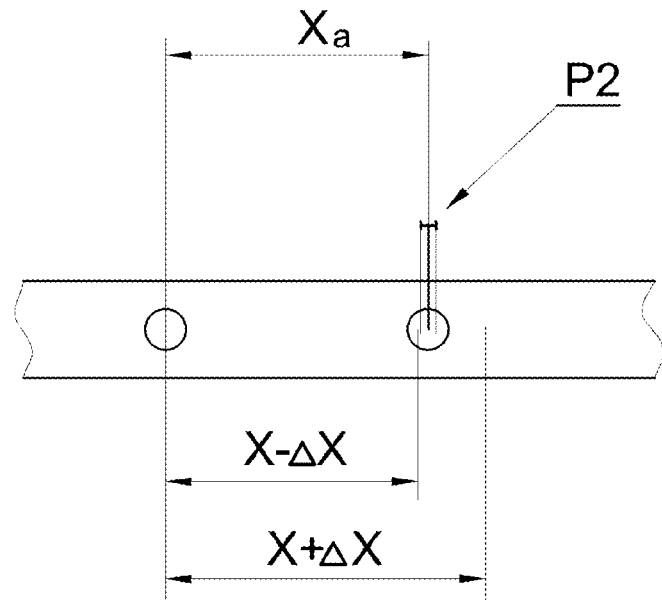
FIG. 12 shows an embodiment of a result of measurement by means of the second measuring unit.

FIG. 7 shows an exemplary rod-like article in the form of a filter rod, in which there are four capsules positioned in the filtering material. Such a rod will be cut in further production stage into four equal parts, which will be attached to tobacco rods in order to manufacture filter cigarettes. Parts of such a rod may also be used for manufacturing multi-segment filter rods, which will be then cut into parts, which will be attached to tobacco rods in order to manufacture multi-segment filter cigarettes. During the manufacturing process, a number of rods quality parameters is inspected. The quality parameter may be the rod diameter, rod length or the position of capsules along and transversely to the axis of the rod. The quality parameter may be the distance Y from the centre of a first capsule to the rod end. FIG. 7 presents the minimum acceptable distance $Y-\Delta Y$ and maximum acceptable distance $Y+\Delta Y$ from the centre of a capsule to the end of the rod, whereas the doubled value of the range $\Delta Y$ constitutes the tolerance zone for the distance from a capsule to the end of the rod. Similarly FIG. 8 shows a parameter being the distance X between the neighbouring capsules in the rod. The minimum acceptable value for this parameter amounts to $X-\Delta X$, whereas the maximum acceptable value of this parameter amounts to $X+\Delta X$. The quality parameter may also be the rod length. FIG. 9 shows the course of signal from a microwave sensor adjusted for checking capsules presence, quality, filling and position of capsules in an endless rod, whereas it is a presentation of a situation where the capsules are distributed in nominal places along the rod, they are spherical and they are not damaged. FIG. 10 shows an endless rod in which the capsule 50 is not spherical, is of elongated, round shape and it is not placed in a proper place. The signal obtained from the microwave sensor for this capsule is of a different course than for the remaining capsules. The distances read by the measuring unit are as follows: the distance between the capsule 50 and the capsule 51 neighbouring to the left amounts to X2, whereas the distance between the capsule 50 and the capsule 52 to the right amounts to X3. It may happen that the distance X2 is close to the acceptable value $X+\Delta X$ and lower than such limit value and the additional measurement by means of the optical sensor will show that the distance X2 exceeds the acceptable value $X+\Delta X$ of the parameter. Then the rod in which the capsules distributed in such a way are placed has to undergo a repeated measurement in order to verify the measurements. Even if the microwave sensor and the optical sensor provide the same result close to the limit parameter value, the rod in which the capsules distributed in such a way are placed has to undergo a repeated inspection, because the signal pattern itself may suggest that the capsule is either a little bit deformed or it has been damaged and the aromatic substance has leaked, which should be clearly stated and the rod should be either rejected or allowed for further production stages. The repeated measurement is effected with higher measuring accuracy, for instance by means of the same sensors but at lower speed of transferring rods, which eliminates errors caused by accidental interruptions arising at high speed of transferring rod during the measurement. Alternatively, the repeated measurement may be effected by means of sensors having higher measuring accuracy. FIGS. 11 and 12 show the additional capsule 54 placed at the distance Xa from the neighbouring capsule 55. The limit minimum and maximum distance of the centre of capsule 54 to the centre of capsule 55 is defined by the values $X-\Delta X$ and $X+\Delta X$ respectively, whereas in one of the embodiments it is possible to assume the limit ranges asymmetrically, which, in such a case, would amount to X−ΔX' and X+ΔX" respectively. FIG. 11 refers to the measurement performed by the first measuring unit with first measuring accuracy, whereas FIG. 12 refers to the measurement performed by the second measuring unit with the second measuring accuracy, whereas the second measuring accuracy is higher than the first accuracy. The field P1 shows possible dispersion of the value of measured distance Xa during the measurement by the first measuring unit. For the distance Xa the actual value may fall outside the tolerance range for the particular accuracy of measurement of the first measuring unit for the performed measurement, i.e. in the said embodiment the value may be below the minimum acceptable value X−ΔX. The distance Xa measured by the second measuring unit may be of different value than in the case of the measurement performed by the first measuring unit. The field P2 shows possible dispersion of the measured distance Xa during the measurement by the second measuring unit. The second measuring unit measures with higher accuracy, the field P2 is smaller than the field P1. In the embodiment the actual distance Xa measured by the second measuring unit falls within the tolerance range of ±ΔX. Favourably, the difference between the measured value of the said parameter and the limit value of the range of values of the said parameter is equal to or less than the measurement accuracy.

Figure 13:
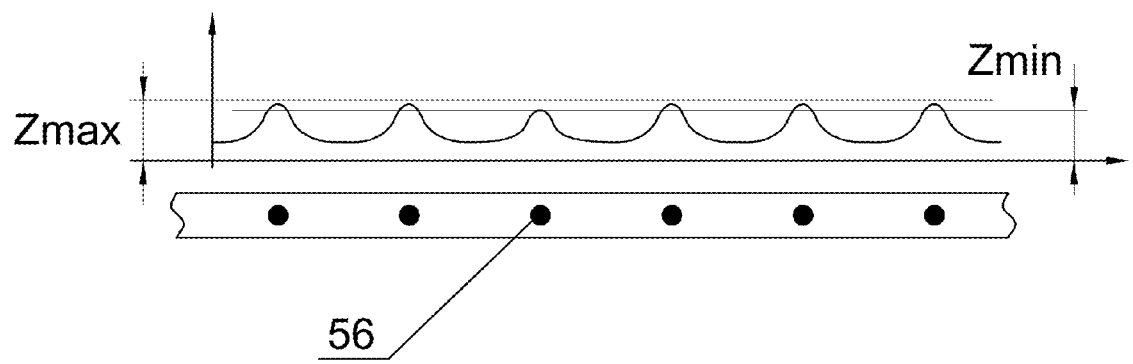
FIG. 13 shows courses of signal from the sensor for the endless rod with capsules.

FIG. 13 shows a signal course of a microwave sensor applied to the manufacturing filter rods with capsules. The signal course outline includes the information on filling the capsules with the aromatic substance, in general, the information about the capsules quality and the peak signal pattern points should fall within the acceptable range between the lower value Zmin and the upper value Zmax. Apparently, for the capsule 56 the value of the signal assumes the lower limit acceptable value Zmin. It should be also noted, that the registered signal pattern is prepared with a certain accuracy, which means that the actual value of the signal peak for the capsule 56 may fall within as well as be outside the acceptable range. In order to ensure the quality, the rod in which the aforementioned capsule is placed, should undergo a repeated measurement with higher accuracy.

Figure 14:
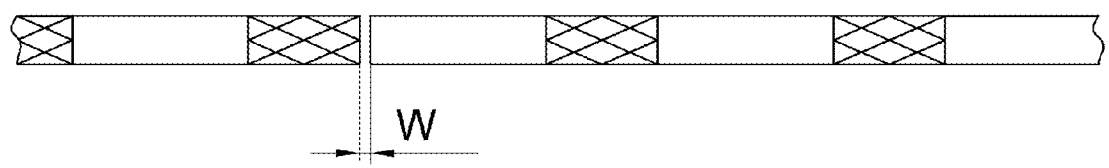
FIG. 14 shows a multi-segment endless rod.

FIG. 14 shows an endless multi-segment rod, in which all the segments should adjoin each other, i.e. lack of a gap between the segments or presence of a gap not higher than the gap resulting from deformations of the face surfaces of segments. In the case the gap W occurs, the measuring unit 5 will generate a signal indicating the presence of the gap. If the measured gap is of the width close to the acceptable limit value, then the rod in which the segments being spaced apart from each other are present, should undergo a repeated quality inspection.

The invention claimed is:

1. A system rod-like articles, comprising
a machine to manufacture the rod-like articles or a feeding device for delivering the rod-like articles,
a first measuring unit for measuring at least one quality parameter of the manufactured rod-like articles, which measures with a first measuring accuracy, whereas the said quality parameter has a predefined range of acceptable values of the parameter,
a device for dividing a stream of the rod-like articles into a first stream including the rod-like articles having said at least one quality parameter which falls within the range of the acceptable values of the parameter and into a second stream of the rod-like articles, having the said at least one quality parameter which does not fall within the range of the acceptable values of the parameter,
a first transferring device, which receives the first stream of the rod-like articles and transfers this stream as an output stream of the rod-like articles manufacturing system,
wherein it is moreover equipped with
a device for a repeated inspection of the said quality parameter, including a measuring conveyor which receives the second stream of the rod-like articles and a second measuring unit which effects a repeated measurement of the said quality parameter of the rod-like article with a second measuring accuracy higher than the first measuring accuracy of the first measuring unit, whereas the device for the repeated inspection of the said quality parameter belongs to the repeated quality inspection path,
a second transferring device which transfers the inspected rod-like article to the output stream of the rod-like articles on the first transferring device, when the result of the repeated inspection of the said at least one quality parameter of an individual rod-like article falls within the range of the acceptable values of the said parameter.

2. The system according to claim 1, wherein, the machine for manufacturing the rod-like articles is a machine for manufacturing the rod-like articles by forming an endless rod, whereas the machine is equipped with a cutting head for cutting of the endless rod into single rod-like articles, whereas the first measuring unit effects the measurement of the said at least one quality parameter of the endless rod with the first measuring accuracy, where the said appropriate quality parameter is assigned to a single rod-like article on the basis of the measurements of the endless rod.

3. The system according to claim 2, wherein, the device for the repeated parameter inspection is effecting the repeated measurement of the said at least one quality parameter at a lower article transfer speed than the transfer speed during the first measurement.

4. The system according to claim 1, wherein, the output stream is a mass flow.

5. The system according to claim 4, wherein, the device for the repeated parameter inspection is effecting the repeated measurement of the said at least one quality parameter at a lower article transfer speed than the transfer speed during the first measurement.

6. The system according to claim 1, wherein, the measurement by means of the first measuring unit is effected on at least one drum conveyor.

7. The system according to claim 6, wherein, the device for the repeated parameter inspection is effecting the repeated measurement of the said at least one quality parameter at a lower article transfer speed than the transfer speed during the first measurement.

8. The system according to claim 1, wherein, the device of the repeated parameter inspection is effecting the repeated measurement of the said at least one quality parameter at a lower article transfer speed than the transfer speed during the first measurement.

* * * * *

UNITED STATES PATENT AND TRADEMARK OFFICE
CERTIFICATE OF CORRECTION

PATENT NO. : 9,743,689 B2
APPLICATION NO. : 15/295705
DATED : August 29, 2017
INVENTOR(S) : Leszek Sikora et al.

It is certified that error appears in the above-identified patent and that said Letters Patent is hereby corrected as shown below:

In the Claims
Correct Claim 1 Line 1 as follows:
1. A system for manufacturing rod-like articles, comprising Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*